Feb. 9, 1954
W. A. HYLAND
2,668,737
GRAIN DRILL
Original Filed July 21, 1944
3 Sheets-Sheet 1
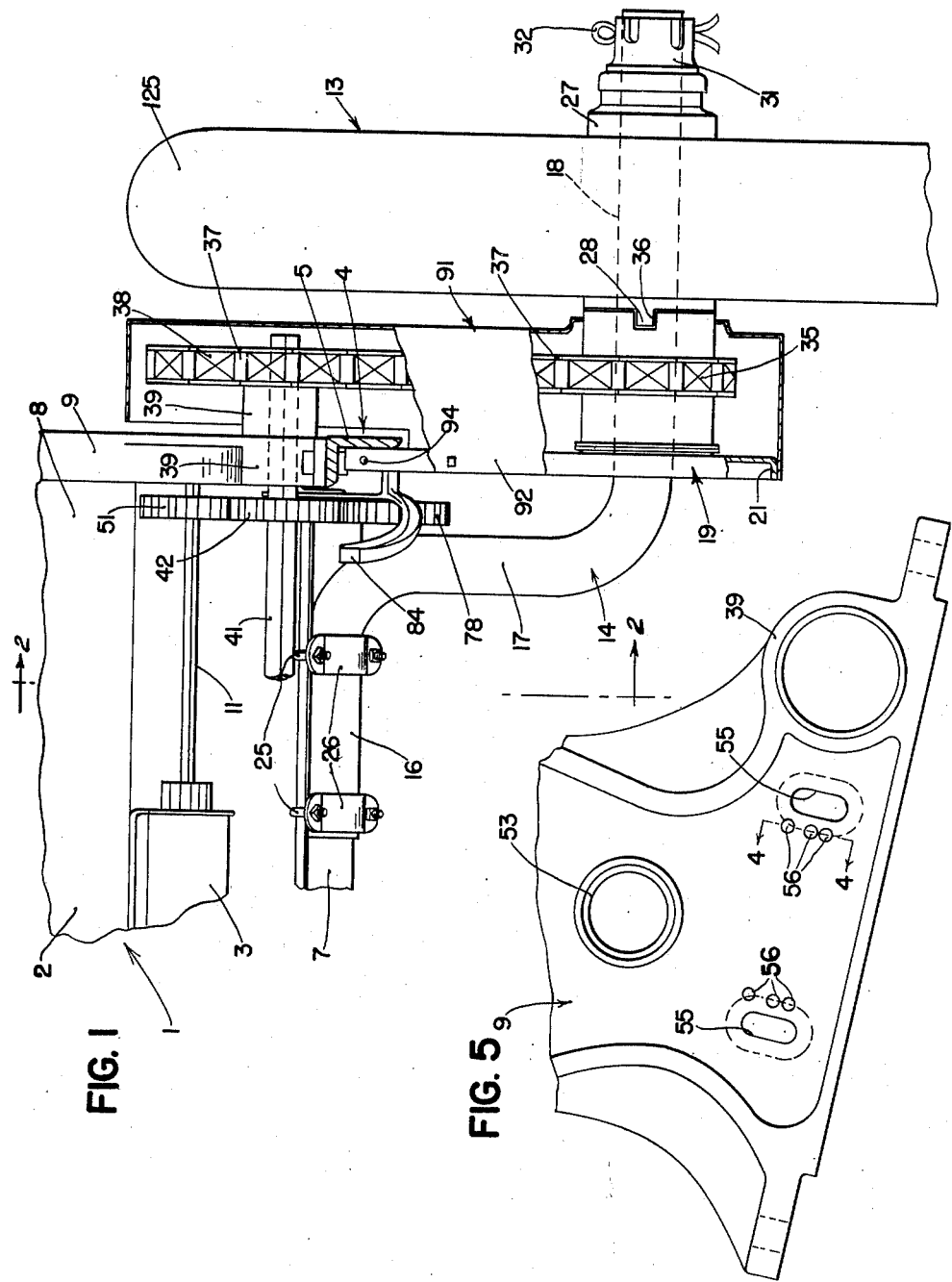
INVENTOR.
WILLIAM A. HYLAND
BY
ATTORNEYS
WITNESS Feb. 9, 1954 W. A. HYLAND 2,668,737
GRAIN DRILL
Original Filed July 21, 1944 3 Sheets-Sheet 2
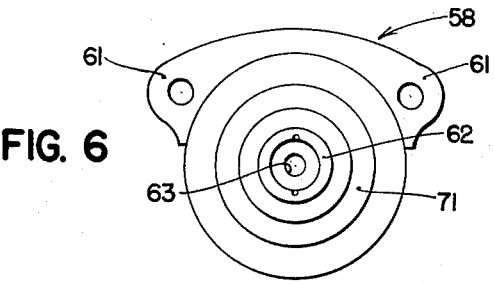
FIG. 6
FIG. 2
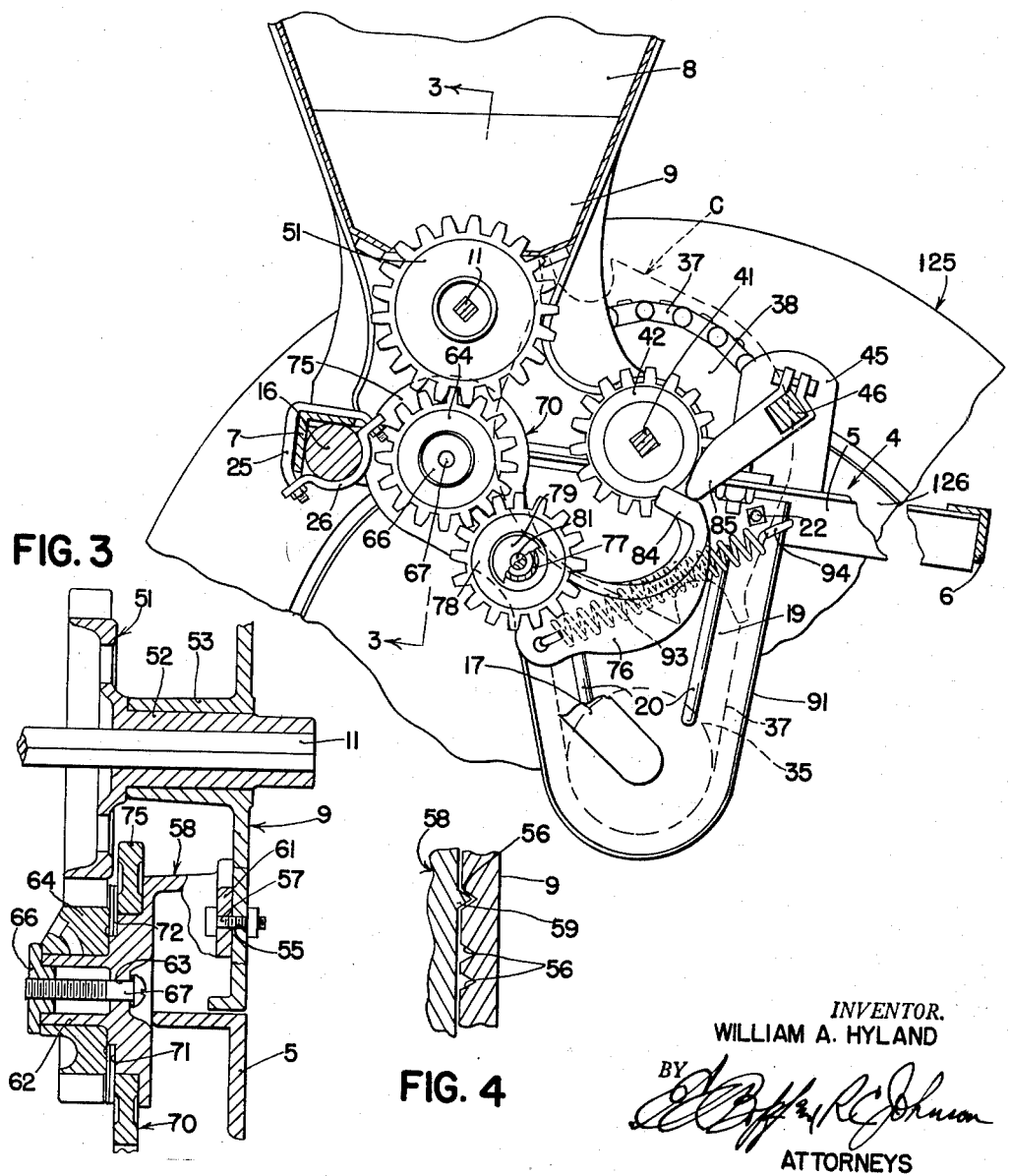
FIG. 3
FIG. 4
INVENTOR.
WILLIAM A. HYLAND
BY
ATTORNEYS Feb. 9, 1954 W. A. HYLAND 2,668,737
GRAIN DRILL
Original Filed July 21, 1944 3 Sheets-Sheet 3

INVENTOR
WILLIAM A. HYLAND
BY
ATTORNEYS

Patented Feb. 9, 1954

2,668,737

UNITED STATES PATENT OFFICE 2,668,737

GRAIN DRILL

William A. Hyland, Horicon, Wis., assignor to John Deere Van Brunt Company, a corporation of Wisconsin Continuation of application Serial No. 545,915 July 21, 1944. This application August 22, 1949, Serial No. 111,690

9 Claims. (Cl. 301—125)

This application is a continuation of my co-pending application, Serial No. 545,915, filed July 21, 1944, now abandoned.

The present invention relates generally to agricultural implements and more particularly to grain drills.

The object and general nature of the present invention is the provision of a new and improved grain drill of the drop axle type in which, while the seed box and seed distributing mechanism are supported the desired distance above the ground, wheels of relatively small diameter, such as those particularly adapted to take used automobile tires, are employed. A further feature of this invention is the provision of new and improved driving connections between the ground wheels and the seeding mechanism. Still further, another feature of the present invention is the provision of a new and improved drop axle support in which the driving connections extend from the wheel to the seeding mechanism through a jackshaft which may be used to operate units or mechanism other than the seeding mechanism, such as, for example, the tool lifting mechanism, as well as other attachments. Further, it is an additional feature of the present invention to provide a new and improved swinging gear hanger unit for engaging and disengaging the drive to the feed shaft of the seeding mechanism.

These and other objects and advantages of the present invention will be apparent to those skilled in the art after a consideration of the following detailed description, taken in conjunction with the accompanying drawings in which the preferred form of the invention has been shown by way of illustration.

In the drawings:

Figure 1 is a front view of one end of a grain drill in which the principles of the present invention have been incorporated, certain parts being broken away.

Figure 2 is a sectional view taken generally along the line 2—2 of Figure 1.

Figure 3 is a section taken generally along the line 3—3 of Figure 2.

Figure 4 is a fragmentary view showing the optional mounting of a gear hanger pivot member and corresponds to a section taken along the line 4—4 of Figure 5.

Figure 5 is a fragmentary view of the grain drill end bracket, showing the position for adjustable mounting of the gear hanger pivot member.

Figure 6 is a detail view of the gear hanger pivot member.

Figure 7:
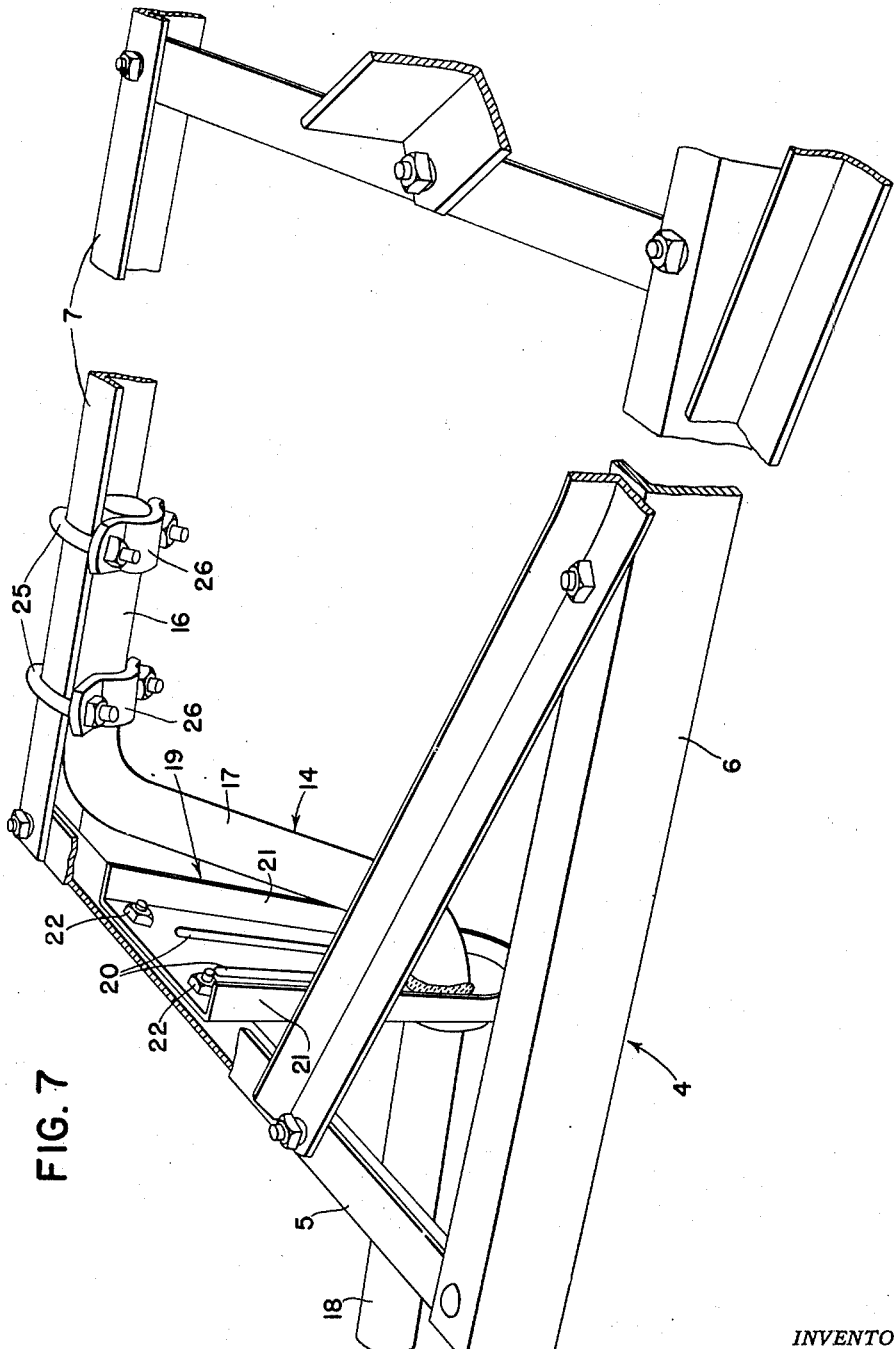
Figure 7 is a fragmentary perspective view showing the frame and drop axle construction.

Referring now more particularly to the drawings, the implement in which the principles of the present invention have been illustrated comprises a grain drill, indicated in its entirety by the reference numeral 1, which is made up of a transversely extending seed box 2 carrying along the bottom thereof a plurality of seed dispensing units 3. The seed box 2 is supported on a frame 4 which includes transversely extending front and rear frame angles 6 and 7 and a plurality of longitudinally extending frame members, including end members 5, which are secured in any suitable manner to the front and rear members 6 and 7. The frame 4 also includes a hitch structure by which the drill may be connected to a source of propelling power, such as a tractor or the like. The seed box 2 includes box ends 8 that receive end supporting brackets 9 which form the means whereby the seed box 2 is mounted on the frame 4. The supports 9 are apertured to receive a seeding shaft 11 which actuates the various seeding units 3 and receives power from the ground wheels of the grain drill.

Each end of the frame is supported on a ground wheel unit 13. Each of the ground wheel units 13 comprises a drop axle 14 that is made up of a shaft bent into generally Z formation, thereby providing an upper horizontal axle section 16, a downwardly extending or depending section 17, and a laterally outwardly extending wheel-receiving section 18. Secured as by welding to the axle section 18 is a sheet metal strut 19 which is ribbed, as at 20, for strength and also is flanged, as at 21, for the same purpose. The upper portion of the strut is apertured so as to be bolted, as at 22, to the vertical flange of the associated end frame angle 5, and the horizontal section 16 of the axle 14 is disposed inside the rear frame angle and rigidly secured thereto by a pair of U-bolts 25 and clamping cap members 26. Normally the depending section 17 of the axle extends downwardly and forwardly and the strut section 19 is secured to the wheel-receiving section 18 of the axle, adjacent the laterally innermost portion of said wheel-receiving section, so that when connected to the frame the strut section extends substantially vertically upwardly from the wheel-receiving axle section 18 to the frame end angle 5. The strut section 19 is of generally upwardly diverging or triangular configuration to provide the necessary strength without unnecessary weight. As best shown in Figure 1, the strut 19 is disposed laterally outwardly of the depending axle section 17 and is in the plane of the frame end angle 5.

Mounted on each of the axles 14 is a ground wheel 125. Each wheel is of relatively small diameter as compared with conventional grain drill supporting wheels, so as to make it possible to utilize automobile tires, either new or used. This has the advantage of providing a relatively inexpensive wheel, for tires of this type, due to the mass production conditions under which they are manufactured, are much cheaper than special type tires. Each wheel 125 includes a wheel body 126 receiving a pneumatic or other tire and a hub 27 to which the wheel body is connected in any suitable manner. The hub 27 is provided with a plurality of lugs 28, preferably two, and the hub 27 is mounted for rotation on the wheel-receiving section 18 of the axle 14, being held in position thereon by any suitable means, such as a cap 31 and a cotter 32. The inner end of the wheel hub 27 is extended laterally inwardly beyond the plane of the inner face of the wheel and provides a support for a drive sprocket 35 which is provided with a pair of slots 36 to receive the lugs 28 mentioned above. A chain 37 is trained about the sprocket 35 at its lower end and at its upper end is trained over a sprocket 38 which is journaled for rotation in a bearing structure 39 formed on the supporting bracket 9 and which also receives the outer end of a jackshaft 41. A driving gear 42 is fixed in any suitable manner to the jackshaft 41 laterally inwardly of the bearing structure 39. Also, each frame end angle 5 carries a supporting bracket 45 adjacent the bearing structure 39, and each bracket 45 receives a rockable pressure shaft 46 to which pressure arms are attached. The pressure arms are connected with the several furrow openers (not shown) for the purpose of applying pressure to the furrow openers when they are in their lowered position, according to the position of the rockable pressure shaft 46. Generally, a self-interrupting clutch, such as the one shown in the co-pending U. S. application filed by John H. Starr and myself March 30, 1944, Serial No. 528,795, now U. S. Patent 2,432,897, issued December 16, 1947, is employed for raising and lowering the furrow openers. As shown at C in Figure 2, such a self-interrupting clutch is actuated by the jackshaft 41 for optionally operating the pressure shaft 46.

The mechanism for driving the seeding shaft 11 from the ground wheel 125 will now be described. A gear 51 is provided with an elongated hub section 52 which is journaled for rotation in a bearing section 53 formed on the box and support member 9. The hub section 52 receives the seeding shaft 11 in non-rotatable relation. Each box end support member 9 is provided with a pair of vertical slots 55 and, adjacent thereto, a plurality of recesses 56. Extending through each pair of slots 55 are bolts 57 which fasten to the member 9 a gear hanger pivot member 58. The latter is provided with a pair of projections 59 which may be disposed in any of the several pairs of openings or recesses 56 so as to dispose the pivot member 58 in different positions with respect to the axis of rotation of the seeding drive gear 51. The hanger support member 58 is of special construction, embodying an upper pair of apertured lugs 61 to receive the bolts 57, the lower portion of the pivot member 58 being disposed in laterally outwardly spaced overhanging relation, as best shown in Figure 3, so as to clear the horizontal flange of the associated frame end angle 5. The gear hanger pivot member 58 is provided with a stud 62 and is apertured, as at 63. The stud 62 receives an idler gear 64 which is held in place on the stud 62 by means of a cap 66 and a bolt 67 which holds the cap in place.

A swinging gear hanger, indicated in its entirety by the reference numeral 70, is mounted for swinging movement on a shouldered section 71 formed on the gear hanger 58 just inwardly of the gear 64. Preferably, thrust washers 72 are disposed between the gear 64 and the shouldered section 71 on which the gear hanger 70 is mounted. The latter member, as best shown in Figure 3, comprises a hub section 75 adapted to be mounted on the shouldered section 71 of the pivot member 58 and a depending section 76 which, adjacent the section 75, carries a laterally outwardly directed stud 77 (Figure 2) on which a second idle gear 78 is mounted for rotation. The gear 78 meshes with the idle gear 64 and the latter, in turn, meshes with the seeding shaft drive gear 51. The gear 78 is held in place by a cap member 79 and a bolt 81 that extends through the stud section 77 on the gear hanger 70. The depending section of the gear hanger 70 is extended forwardly and also laterally inwardly, to form an abutment section 84 that is adapted to be engaged by an arm 85 carried by the pressure shaft 46, whereby whenever the latter is operated to raise the furrow openers, the arm 85 engages the gear hanger section 84 and swings the same about its pivotal support on the member 58 so as to carry the gear 78 out of mesh with the gear 42 that is fixed to the jackshaft 41. Thus, whenever the furrow openers are raised, the drive from the ground wheel to the seeding shaft is automatically interrupted, and when the pressure shaft is rocked in a direction to move the furrow openers into their operating position, the drive between the ground wheels and the seeding shaft or shafts is automatically reestablished. A chain guard 91 is disposed about the driving chain 37 and comprises a sheet metal enclosure, also ribbed for strength, which includes side flanges, extended, as at 92, so as to fit over the flanges of the strut 19. The chain guard 91 is held in place by screws or bolts fastening it to the flanged sheet metal strut 19.

The driving ratio between the ground wheels and the seeding shaft 11 may be varied by substituting different sizes of gears 51, the gear hanger support member 58 being adjustable toward and away from the axis of the seeding shaft for the purpose of accommodating the different sizes of gears that may be made available. To effect such an adjustment, the bolts 57 are loosened and the gear hanger support 58 shifted into any one of the available positions, such positions being determined by the projections 59 entering one or the other of the sets of recesses in the box end support member receiving them. After the proper position has been secured, the bolts 57 are tightened to fix the gear hanger support member firmly in position. A spring 93 is connected at one end to the gear hanger end at the other end to a fastening 94 carried preferably by the strut 19. The spring 93 serves to yieldingly hold the swinging gear hanger in a position causing the associated gears to mesh in driving relation. However, if the drive should be reversed, the gear hanger automatically permits the gears to ratchet.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In a grain drill or the like, a frame including a transversely extending rear crossbar and a fore and aft extending end bar, supporting means for the frame including a laterally inwardly extending attaching section, a downwardly and forwardly extending section connected with the laterally outer end of said attaching section, a laterally outwardly wheel-receiving section connected with the lower end of said downwardly and forwardly extending section, and a strut section fixed to said supporting means adjacent the inner portion of said wheel-receiving section and extending generally vertically upwardly therefrom to a point of connection against one side of said end bar, means for connecting said attaching section to the rear crossbar so that both the attaching section and the downwardly and forwardly extending section lie laterally inwardly of the vertical plane of that portion of the end bar that receives the upper end of said strut section, and means for securing the upper end portion of said strut section to said end bar at said one side thereof.

2. In a grain drill or the like, a frame including a transversely extending rear crossbar and a fore and aft extending end bar, each of said bars comprising an angle and each angle being arranged with one flange extending generally vertically downwardly and the other flange extending generally horizontally and inwardly of the frame, supporting means for the frame including a laterally inwardly extending attaching section, a downwardly and forwardly extending section connected with the laterally outer end of said attaching section, a laterally outwardly extending wheel-receiving section connected with the lower end of said downwardly and forwardly extending section, and a strut section fixed to said supporting means adjacent the inner portion of said wheel-receiving section and extending generally vertically upwardly therefrom, means for connecting said attaching section to the rear crossbar so that both the attaching section and the downwardly and forwardly extending section lie laterally inwardly of the vertical plane of the end bar and so that the upper end of said strut section lies below the horizontal flange of said end bar and at the laterally inner side of the vertical flange of said end bar, and means for securing the upper end portion of said strut section to the vertical flange of the end bar with the upper end of said strut section lying in the angle formed by the horizontal and vertical flanges of said end bar.

3. In a grain drill or the like, a frame including a transversely extending rear crossbar and a fore and aft extending end bar, each of said bars comprising an angle and each angle being arranged with one flange extending generally vertically downwardly and the other flange extending generally horizontally and inwardly of the frame, supporting means for the frame including a laterally inwardly extending attaching section, a downwardly and forwardly extending section connected with the laterally outer end of said attaching section, a laterally outwardly extending wheel-receiving section connected with the lower end of said downwardly and forwardly extending section, and a strut section fixed to said supporting means adjacent the inner portion of said wheel-receiving section, said strut section comprising a plate-like member having generally vertical, laterally inwardly directed flanges at the front and rear edges of said plate section, said strut section extending generally vertically upwardly from the inner portion of said wheel-receiving section, means for connecting said attaching section to the rear crossbar in a position thereon such that said attaching section lies within the angle formed by the horizontal and vertical flanges of said rear crossbar and so that both the attaching section and the downwardly and forwardly extending section lie laterally inwardly of the vertical plane of the end bar and so that the upper ends of the plate section and vertical flanges of said strut section lie below the horizontal flange of said end bar and at the laterally inner side of the vertical flange of said end bar, and means for fixing the upper end portion of the plate section of said strut section to the vertical flange of the end bar with the upper ends of the plate section and said vertical flanges of said strut section lying within the angle formed by the horizontal and vertical flanges of said end bar.

4. In a grain drill or the like having a frame including a transversely extending rear crossbar and a fore and aft extending end bar, each of said bars comprising an angle and each angle being arranged with one flange extending generally vertically downwardly and the other flange extending generally horizontally and inwardly of the frame, the improvements which include supporting means for the frame including a laterally inwardly extending attaching section, a downwardly and forwardly extending section connected with the laterally outer end of said attaching section, a laterally outwardly extending wheel-receiving section connected with the lower end of said downwardly and forwardly extending section, and a strut section fixed to the inner portion of said wheel-receiving section and extending generally vertically upwardly therefrom, said strut section including a plate section extending generally vertically and laterally inwardly extending vertical flanges at the vertical edge portions of said plate section, means for connecting said attaching section to the rear crossbar so that both the attaching section and the downwardly and forwardly extending section lie laterally inwardly of the vertical plane of the end bar and so that the upper ends of said strut plate section and vertical flanges lie below the horizontal flange of said end bar and at the laterally inner side of the vertical flange of said end bar, and means for securing the upper end portion of said strut section to the vertical flange of the end bar with the upper ends of said strut plate section and vertical flanges lying in the angle formed by the horizontal and vertical flanges of said end bar.

5. The invention set forth in claim 4, further characterized by a chain guard disposed laterally outwardly of said plate section and fixed to the vertical flanges on said strut section.

6. In a grain drill or the like, a frame including a transversely extending crossbar and a fore and aft extending end bar, each of said bars comprising an angle and each angle being arranged with one flange extending generally vertically downwardly and the other flange extending generally horizontally and inwardly of the frame, supporting means for the frame including a laterally inwardly extending attaching section, a section connected with the laterally outer end of said attaching section and extending generally downwardly therefrom at an angle to the horizontal, a laterally outwardly extending wheel-receiving section connected with the lower end of said generally downwardly extending section, and a strut section connected to said supporting means adjacent the laterally innermost portion of said wheel-receiving section, said strut section comprising a plate-like member having generally vertical, laterally inwardly directed flanges at the front and rear edges of said plate section, said strut section extending generally vertically upwardly from the inner portion of said wheel-receiving section, means for connecting said attaching section to the crossbar in a position thereon such that said attaching section lies within the angle formed by the horizontal and vertical flanges of said crossbar and so that both the attaching section and the generally downwardly extending section lie laterally inwardly of the vertical plane of the laterally outer portion of said end bar and so that the upper ends of the plate section and vertical flanges of said strut section lie below the horizontal flange of said end bar and at the laterally inner side of the vertical flange of said end bar, and means for fixing the upper end portion of the plate section of said strut section to the vertical flange of the end bar.

7. In a grain drill or the like, a frame including a transversely extending crossbar and a fore-and-aft extending end bar, said end bar comprising an angle arranged with one flange extending generally vertically downwardly and the other flange extending generally horizontally and inwardly of the vertical flange, supporting means for the frame including a laterally inwardly extending attaching section, a section connected with the laterally outer end of said attaching section and extending generally downwardly therefrom at an angle to the horizontal, a laterally outwardly extending wheel-receiving section connected with the lower end of said downwardly extending section, and a strut section connected to said supporting means adjacent the laterally innermost portions of said wheel-receiving section, said strut section comprising a plate-like member having generally vertical, laterally directed flanges at the front and rear edges of said plate section, said strut section extending generally vertically upwardly from the inner portion of said wheel-receiving section, means for connecting said attaching section to the crossbar in a position thereon such that both the attaching section and the generally downwardly extending section lie laterally inwardly of the vertical plane of the vertical flange of said end bar, and means for fixing the upper end portion of said strut section to the laterally inner side of said vertical flange, whereby the upper ends of the plate section and vertical flanges of the strut section lie below the horizontal flange of said end bar.

8. In an agricultural implement, a frame including a transversely extending crossbar and a fore-and-aft extending end bar, each of said bars comprising an angle and each angle being arranged with one flange extending generally vertically downwardly and the other flange extending generally horizontally and inwardly of the frame, supporting means for the frame including a laterally inwardly extending attaching section, a section connected with the laterally outer end of said attaching section and extending generally downwardly therefrom at an angle to the horizontal, a laterally outwardly extending wheel-receiving section connected with the lower end of said generally downwardly extending section, and a strut section connected to said supporting means adjacent the laterally innermost portion of said wheel-receiving section, said strut section comprising a plate-like member having generally vertical, laterally directed flanges at the front and rear edges of said plate section, said strut section extending generally vertically upwardly from the inner portion of said wheel-receiving section, means for connecting said attaching section to the crossbar in a position thereon such that said attaching section lies within the angle formed by the horizontal and vertical flanges of said crossbar and so that both the attaching section and the generally downwardly extending section lie laterally inwardly of the vertical plane of the laterally outer portion of said end bar and so that the upper ends of the plate section and vertical flanges of said strut section lie below the horizontal flange of said end bar and at the laterally inner side of the vertical flange of said end bar, and means for fixing the upper end portion of the plate section of said strut section to the vertical flange of the end bar.

9. In an agricultural implement, a frame including a transversely extending crossbar and a fore-and-aft extending end bar, each of said bars comprising an angle and each angle being arranged with one flange extending generally vertically downwardly and the other flange extending generally horizontally and inwardly of the frame, supporting means for the frame including a laterally inwardly extending attaching section, a section connected with the laterally outer end of said attaching section and extending generally downwardly therefrom at an angle to the horizontal, a laterally outwardly extending wheel-receiving section connected with the lower end of said generally downwardly extending section, and a strut section connected to said supporting means adjacent the laterally innermost portion of said wheel-receiving section, said strut section comprising a plate-like member having generally vertical, laterally directed flanges at the front and rear edges of said plate section, said strut section extending generally vertically upwardly from the inner portion of said wheel-receiving section, means for connecting said attaching section to the crossbar in a position thereon such that said attaching section lies within the angle formed by the horizontal and vertical flanges of said crossbar and so that both the attaching section and the generally downwardly extending section lie laterally inwardly of the vertical plane of the laterally outer portion of said end bar and so that the upper ends of the plate section and vertical flanges of said strut section lie adjacent one side of the end bar, and means for fixing the upper end portion of the plate section of said strut section to the vertical flange of the end bar.

WILLIAM A. HYLAND.

References Cited in the file of this patent

UNITED STATES PATENTS

| Number | Name | Date |
| --- | --- | --- |
| 473,513 | Lamb | Apr. 26, 1892 |
| 1,312,748 | Rauch | Aug. 12, 1919 |
| 1,363,978 | Huckabee | Dec. 28, 1920 |
| 1,799,061 | Petty | Mar. 31, 1931 |
| 2,041,616 | Noell | May 19, 1936 |
| 2,387,504 | Farr | Oct. 23, 1945 |
| 2,391,975 | Hyland | Jan. 1, 1946 |